March 20, 1934. C. MAJOR 1,951,701
CULTIVATING IMPLEMENT
Original Filed April 1, 1932
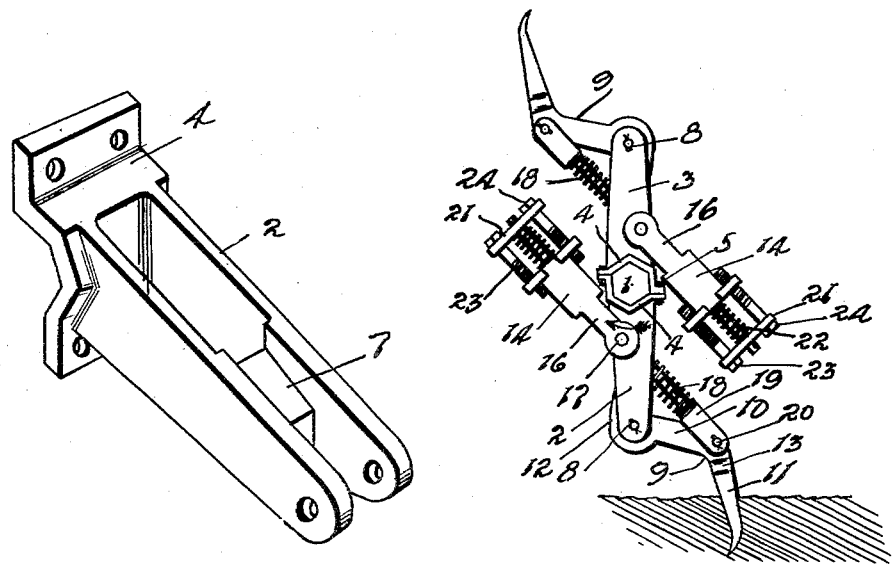
Inventor
C. Major.

Patented Mar. 20, 1934

1,951,701

UNITED STATES PATENT OFFICE 1,951,701

CULTIVATING IMPLEMENT

Cleophas Major, St. Leon, Manitoba, Canada

Application April 1, 1932, Serial No. 602,436
Renewed January 3, 1934

7 Claims. (Cl. 97—184)

The invention relates to improvements in cultivating machines and an object of the invention is to provide a device for effectively cultivating the soil and also for eradicating noxious weeds. A further object is to construct the device that upon encountering a ground obstruction such as a stone or root the tooth engaging the same will clear without damaging the parts and after having cleared, will automatically return to its operating position.

A further object is to construct the working parts so that they can all be readily manufactured and assembled and such that they can be easily and quickly attached to a driving shaft provided.

With the above more important objects in view, the invention consists essentially in the arrangement and construction of parts hereinafter more particularly described, reference being had to the accompanying drawing, in which:—

Fig. 1 is a side view of part of a cultivator showing the shaft and two cultivating teeth thereon.

Fig. 2 is an enlarged detailed vertical sectional view centrally through one of the cultivating elements.

Fig. 3 is a perspective view of the supporting arm.

Fig. 4 is a front view of one of the cultivating teeth.

In the drawing like characters of reference indicate corresponding parts in the several figures.

The device herein disclosed is particularly designed for use on a cultivating machine where a rotatably mounted shaft is power driven and as machines of such general type are well known, it is not considered necessary to describe or show herein the details of the frame construction, it being sufficient for the purposes of the present invention to understand that the shaft shown is rotatably carried at its ends by a suitable frame supported by ground wheels and that the shaft is power driven in the direction of the applied arrow considering the machine is progressing in a direction from left to right.

The rotatably mounted shaft 1 is herein shown as non-circular in order that the arms 2 and 3 associated with the shaft may be effectively clamped thereto in pairs, it being understood that any desirable number of pairs of arms with their teeth can be used depending on the length of the shaft. Each arm is forked and has the inner end terminating in a saddle 4 shaped complementary to the shaft and arranged such that the saddles can be readily fastened firmly to the shaft by bolts 5 and 6. The arms extend radially in opposite directions from the shaft and obviously will rotate with the shaft.

Between the forked outer ends of the arm, I provide a cross web 7 and a bolt 8 connects the outer extremities of the forks of the arm. On each of the bolts 8, I mount pivotally a cultivating tooth 9 which tooth presents a shank 10 and a point 11 disposed at an obtuse angle to the lower end of the shank and has the upper end thereof provided with a finger 12 engageable with the web 7. The point of the tooth is slightly offset as indicated at 13 and the offsets of the teeth of each pair of arms extend in opposite directions so that the points thereof will enter the ground in different locations.

A sleeve 14 is associated with each arm and is provided at its lower end with extending forks 15 and 16 spanning the forks of the arm and pivotally connected thereto at 17. A rod 18 passes freely through the sleeve and has the lower end thereof screw threaded into a clevis 19 pivotally attached at 20 to the lower end of the shank 10, and it will here be observed that the points 17 and 20 are approximately equidistant from the pivot point 8.

On the upper end of the rod, I mount slidably a cross bar 21 which engages with the upper end of a relatively long coil spring 22, the spring passing freely through the sleeve 14 and having its lower end engaging with the clevis. Similar adjusting bolts 23 and 24 pass freely through the ends of the bar 21 and have their lower ends screw threaded through lugs formed at the upper end of the sleeve 14. Obviously one can adjust the tension of the spring by tightening up or loosening the bolts and the tension of the spring will be adjusted as experience dictates, the adjustment given acting to hold the tooth to its work and allowing it to escape a damaging ground obstruction. It will be here noted that the spring normally acts to rotate the tooth in a clockwise direction around the pivot bolt 8 and that in such movement is arrested by the finger 12 engaging with the web 7.

Obviously if the pointed end of a tooth hit a stone, heavy root or the like in the ground, it is free to swing back and up to clear the same as the spring will compress to permit of this and as soon as the obstruction is passed, the tooth will return to its normal forward position. During this movement, the sleeve 14 will rock on the pivot point 17 to accommodate the rod.

As before intimated, any number of pairs of arms can be mounted on the shaft and they will be so placed thereon that the teeth will appear in spiralling rows extending longitudinally of the shaft.

What I claim as my invention is:—

1. The combination with a rotatably mounted driven shaft, of a radial arm permanently fastened to the shaft, a cultivating tooth pivotally attached to the free end of the arm, said tooth presenting a shank and a point positioned at a considerable angle one to the other, adjustable spring means engaging the tooth and acting normally to rotate the tooth in one direction, and stop means carried by the arm and engaging the tooth and normally resisting movement of the tooth in the aforesaid direction.

2. The combination with a rotatably mounted driven shaft, of a radially extending arm permanently fastened to the shaft to rotate therewith, said arm being forked and provided between the forks with a cross web, a cultivating tooth located between the forks and pivotally carried by the arm, said tooth being provided with an extending finger engaging the web and normally preventing rotation in one direction, and adjustable spring means carried by the arm and attached to the tooth and operating to normally maintain the finger in contact with the web.

3. The combination with a rotatably mounted driven shaft, of a radially disposed arm permanently secured to the shaft to rotate therewith, said arm being forked and provided with a cross web between the forks, a shank pivotally mounted between the ends of the forks and provided at one end with a cultivating point extending outwardly at an obtuse angle thereto and at the other end with a stop finger engageable with the web, and spring means interposed between the arm and the rear end of the shank normally holding the finger engaged with the web.

4. The combination with a rotatably mounted driven shaft, of a forked arm permanently secured to the shaft to rotate therewith and provided at its outer end with a cross web between the forks, a shank pivotally mounted between the outer ends of the forks and provided at its pivoted end with a stop finger engageable with the web, said shank extending in a direction transversely of the arm when the finger is engaged with the web, a cultivating point extending outwardly at an obtuse angle from the outer end of the shank and in a direction away from the shaft, a sleeve pivotally attached to the arm, a rod passing slidably through the sleeve and between the forks and having one end pivotally attached to the outer end of the shank, a guide bar adjustably carried by the sleeve and slidably receiving the other end of the rod, and a spring mounted on the rod and passing freely through the sleeve and engaging the bar and normally acting to releasably hold the finger in engagement with the web.

5. The combination with a rotatably mounted driven shaft, of a radial forked arm permanently secured to the shaft to rotate therewith and provided adjoining its outer end with a cross web, a cultivating tooth presenting a shank pivotally attached to the outer ends of the forks and provided at the pivoted end with a finger engageable with the web and at the other end with a cultivating point positioned substantially at an obtuse angle to the shank, a sleeve pivotally attached to the arm, a clevis pivotally attached to the free end of the shank, a rod secured to the clevis and passing between the forks and slidably through the sleeve, a guide bar slidably receiving the free end of the rod, said bar being adjustable towards and away from the sleeve, and a coiled spring mounted on the rod and passing freely through the sleeve and having the ends thereof engaging the bar and the clevis, said spring normally holding the finger engaged with the web.

6. The combination with a rotatably mounted driven shaft, of a pair of similar diametrically opposing forked arms clamped to the shaft to rotate therewith and each provided adjacent its outer end with a cross web between the forks, substantially L-shaped oppositely disposed cultivating teeth pivotally carried by the free ends of the arms and provided at their pivoted ends with stop fingers engageable with the webs, and spring means carried by each arm and engaging the tooth of that arm to normally hold the finger engaged with the web.

7. The combination with a rotatably mounted driven shaft, of a pair of similar diametrically opposing forked arms clamped to the shaft to rotate therewith and each provided adjacent its outer end with a cross web between the forks, oppositely disposed substantially L-shaped cultivating teeth pivotally carried by the free ends of the arms and provided at their pivoted ends with stop fingers engageable with the webs, a sleeve pivotally attached to each arm, a guide rod pivotally attached to each tooth and passing freely between the forks of the arm and slidably through the sleeve, and an adjustable spring mounted on the rod and acting to hold the tooth with the finger thereof engaged with the adjacent web.

CLEOPHAS MAJOR.